(12) United States Patent
Mattar et al.

(10) Patent No.: US 12,056,579 B1
(45) Date of Patent: Aug. 6, 2024

(54) INTELLIGENT SYSTEM FOR AUTOMATED ALLOCATION OF COMPUTING RESOURCES

(71) Applicant: Electronic Arts Inc., Redwood City, CA (US)

(72) Inventors: Mohamed Marwan Mattar, San Francisco, CA (US); Reza Pourabolghasem, San Mateo, CA (US); John Kolen, Half Moon Bay, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 1299 days.

(21) Appl. No.: 15/474,954

(22) Filed: Mar. 30, 2017

(51) Int. Cl.
*G06N 20/00* (2019.01)
*G06F 9/50* (2006.01)

(52) U.S. Cl.
CPC ........... *G06N 20/00* (2019.01); *G06F 9/5038* (2013.01)

(58) Field of Classification Search
CPC .............................. G06N 20/00; G06F 9/5038
See application file for complete search history.

(56) References Cited

U.S. PATENT DOCUMENTS

| | | | | |
|---|---|---|---|---|
| 10,089,661 | B1* | 10/2018 | Appalaraju | G06F 16/907 |
| 2017/0337091 | A1* | 11/2017 | Liu | G06F 9/5027 |
| 2018/0089592 | A1* | 3/2018 | Zeiler | G06N 3/105 |
| 2018/0154899 | A1* | 6/2018 | Tiwari | G05D 1/0212 |
| 2020/0090075 | A1* | 3/2020 | Achin | G06Q 10/06 |

OTHER PUBLICATIONS

Matei Zaharia, Dhruba Borthakur, Joydeep Sen Sarma, Khaled Elmeleegy, Scott Shenker, Ion Stoica, "Job Scheduling for Multi-User MapReduce Clusters", EE department University of California at Berkeley, Report No. UCB/EECS-2009-55, pp. 1-16, Apr. 30, 2009 (Year: 2009).*
Valentina Zanardi, Licia Capra, "Dynamic updating of online recommended systems via feed-forward controllers", Proceedings of the 6th international Symposium on Software Engineering for Adaptive and Self-Managing Systems, May 2011, pp. 11-19. (Year: 2011).*
Jones, W.D. et al., "Application of a usage profile in software quality models," Proc. of the Third European Conf. on Software Maintenance and Reengineering (1999) 10 pp. (Year: 1999).*

* cited by examiner

*Primary Examiner* — Brian M Smith
(74) *Attorney, Agent, or Firm* — Knobbe, Martens, Olson & Bear, LLP

(57) ABSTRACT

Some embodiments herein disclose intelligent priority evaluators configured to perform a method that prioritizes tasks submitted by various users, even if the tasks are similarly classified. The scheduling system can collect, calculate, and use various criteria to determine a reward score in order to prioritize one task over another, such as for dynamic scheduling purposes. This can be performed in addition to or as a replacement for receiving user designations of priority.

20 Claims, 9 Drawing Sheets

INTELLIGENT SYSTEM FOR AUTOMATED ALLOCATION OF COMPUTING RESOURCES

BACKGROUND

Field

This application generally relates to artificial intelligence and data processing systems and corresponding data processing methods and products for emulation of intelligence, such as knowledge based systems, reasoning systems, knowledge acquisition systems, adaptive systems, and machine learning systems.

Description of the Related Art

Computing systems have only a limited ability to emulate human decision making in subjective tasks such as prioritizing one thing over another. Groups of people may submit various tasks to be executed by shared computing resources. The resources might be insufficient to simultaneously execute all the tasks. Accordingly, computers are limited in the ability to decide which tasks should be prioritized over others.

SUMMARY OF THE INVENTION

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

One aspect features a system for prioritizing allocation of the computer resources for training computer-based models. The system comprises a data store configured to store: a plurality of computer-based models; and utility factors and computing resource cost factors associated with the plurality of models. The system comprises: one or more hardware computing devices configured with specific computer-executable instructions, the specific computer-executable instructions stored in an electronic hardware memory, the one or more hardware computing devices configured to: receive, through a computer network, a first instruction data packet comprising an electronic indication indicating a request to train a first model of the plurality of models; receive, through the computer network, a second instruction data packet comprising an electronic indication indicating a request to train a second model of the plurality of models; communicate with the data store to access data packets storing utility factors and computing resource cost factors associated with the first model and the second model; for each of the first model and the second model, determine a reward score, wherein the reward score is determined, based at least in part on: a utility score indicative of the utility of training a model, the utility score based at least in part on utility factors associated with the model, and a resource cost score of training the model, the resource cost score based on at least a plurality of computing resource cost factors associated with the model; determine a prioritized order for the allocation of hardware computing resources for training the first model and the second model, based at least in part on the reward score of the first model and the reward score of the second model; and transmit instructions to the hardware computing resources to implement training of the first model and the second model according to the prioritized order.

In certain embodiments, the system can include any combination of the following features described in this paragraph. The utility factors for training the first model comprises at least one of: a number of asset-generating users affected by training the model; an amount assets affected by training model; a number of users affected by training the model; a number of contacts, sharing, interactions, or relationships between a first user and other uses; or an effectiveness or accuracy of the model. The utility factors for training the first model further comprise an amount of new training data available to train the first model. The reward score is determined based at least in part on an input model, the one or more hardware computing devices configured to generate feedback and retrain the input model. The utility score is further based on a feedback data, and wherein the system is further configured to: update the feedback data in response to the model being trained, wherein the feedback data comprises at least one of: a parameter that the model changes in response to being trained; a change in the accuracy of the model response to being trained; a change in the utility factors after the model is trained compared to before the model is trained; a time that the model is used after being trained; or an amount of use of the model after being trained. The system is further configured to: repeatedly monitor an amount of the computing resources that are available; and automatically re-schedule the prioritized order for the allocation of the computing resources to train models in response to detecting a change in the amount of the computing resources that are available, wherein re-scheduling comprises killing a currently executing task having a lower reward score that is lower than at least one of on the reward score of the first model and the reward score of the second model. The system is further configured to: repeatedly monitor second computing resources, wherein the second computing resources are not allocated to train the first model or the second model; upon detecting a system failure causing underutilization of the second computing resources, allocating at least a portion of the second computing resources to train the at least one of the first model or the second model; and automatically re-schedule the at least one of the first model or second model among both the computing resources and the portion of the second computing resources. The prioritized order supersedes at least one human-input indicating an order for training the first model and the second model.

Another aspect features a computer-implemented method for intelligently retraining models, the method comprising: storing a plurality of models; retraining the plurality of models; scheduling an allocation of the computing resources to train at least some of the plurality of models, wherein the schedule prioritizes models for training based, at least in part, on a reward score, wherein the reward score is determined, at least in part, based on: a utility score indicative of the utility of training a model, the utility score based at least in part on a utility factor stored in the data store, and a resource cost of training the model; and training the plurality of models according to the scheduled allocation of the computing resources.

In certain embodiments, the computer-implemented method can include any combination of the following features described in this paragraph. The utility factor comprises at least one of: a number of asset generating users affected by training the model; an amount assets affected by training model; a number of users affected by training the model; a number of contacts, sharing, interactions, or relationships between a first user and other uses; a effectiveness or accuracy of the model. The utility score is further based on a second utility factor comprising a number of new training data elements available to train the model. The utility score is further based on an amount that parameters of the model changed in response to a previous training of the model. The utility score is further based on feedback data, and wherein method further comprises: updating the feedback data in response to the model being trained, wherein the feedback data comprises at least one of: an amount that a parameters of the model changes in response to being trained; an change in the accuracy of the model response to being trained; an change in the utility factor after the model is trained compared to before the model is trained; a time that the model is used after being trained; or an amount of use of the model after being trained. The method can further comprise repeatedly monitoring an amount of the computing resources that are available; and automatically re-schedule the allocation of the computing resources to train at least some of the plurality of models in response to detecting a change in the amount of the computing resources that are available. The method can further comprise: repeatedly monitoring second computing resources, wherein the second computing resources are not allocated to train the plurality of models; upon detecting a system failure causing under-utilization of the second computing resources, allocating at least a portion of the second computing resources to train the at least some of the plurality of models; and automatically re-scheduling the at least some of the plurality of models among both the computing resources and the portion of the second computing resources. The method can further comprise scheduling an allocation of the computing resources to train a first model of the plurality of models before a second model of the plurality of models such that at least one human-input indication that the second model should be scheduled before the first model is superseded.

Another aspect features a non-transitory computer readable medium comprising instructions executable on one or more processors to cause a system to: store a plurality of models; train the plurality of models; schedule an allocation of the computing resources to train at least some of the plurality of models, wherein the schedule prioritizes models for training based, at least in part, on a reward score, wherein the reward score is determined, at least in part, based on: a utility score indicative of the utility of training a model, the utility score based at least in part on a utility factor stored in the data store, and a resource cost of training the model; and train the plurality of models according to the scheduled allocation of the computing resources.

In certain embodiments, the non-transitory computer readable medium can include any combination of the following features described in this paragraph. The utility factor comprises at least one of: a number of asset generating users affected by training the model; an amount assets affected by training model; a number of users affected by training the model; a number of contacts, sharing, interactions, or relationships between a first user and other uses; or a effectiveness or accuracy of the model. The utility score is further based on a second utility factor comprising a number of new training data elements available to train the model. The utility score is further based on an amount that parameters of the model changed in response to a previous training of the model.

DETAILED DESCRIPTION OF EMBODIMENTS

Introduction

Figure 1:
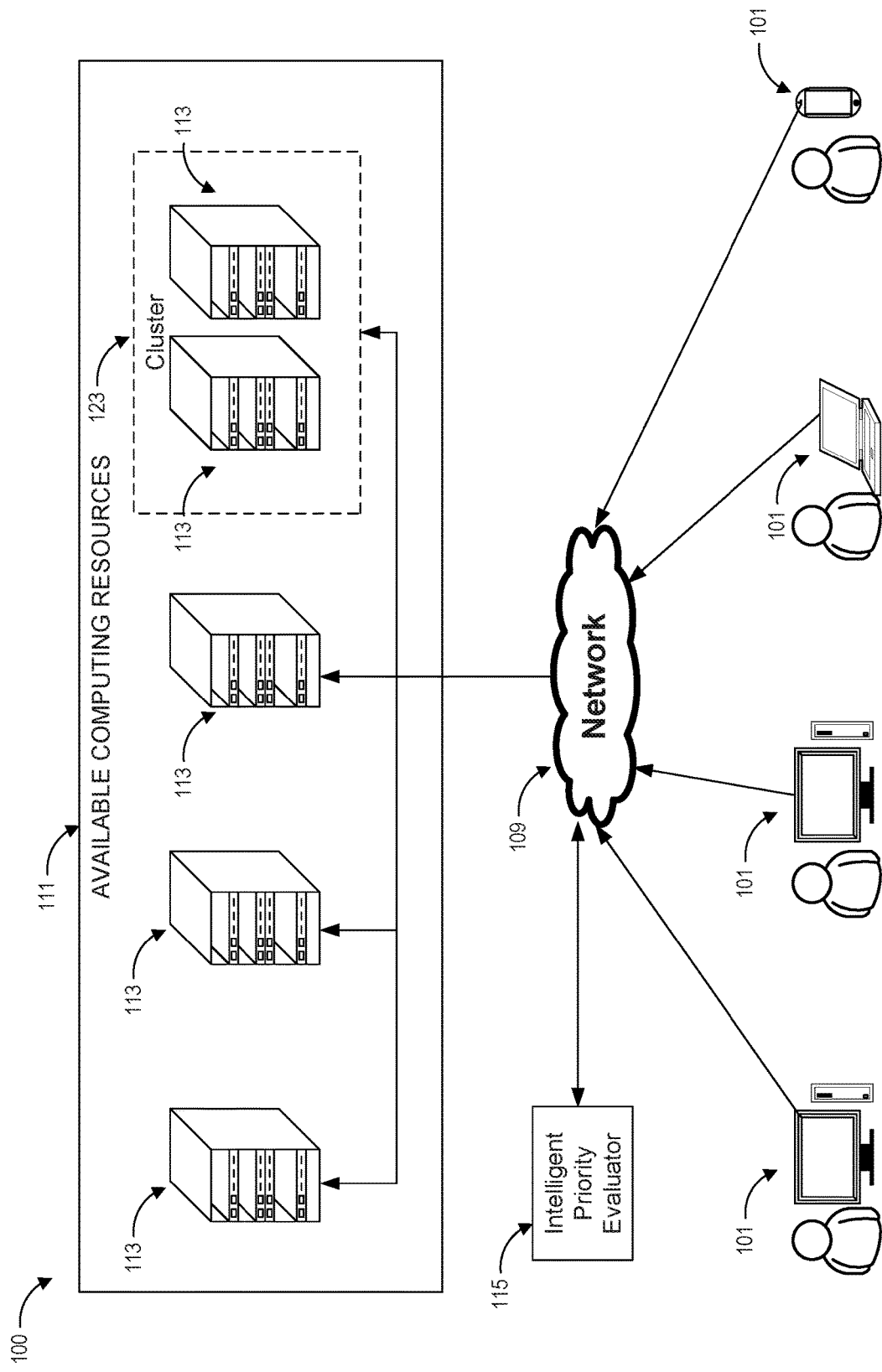
FIG. 1 illustrates an embodiment of a system with allocated, shared computing resources.

Some embodiments herein disclose an artificial intelligence system that can dynamically prioritize and schedule allocation and usage of computing resources. The artificial intelligence system can use an intelligent priority evaluator configured to prioritize tasks submitted by various users. The artificial intelligence system can collect, calculate, and use various criteria to determine a reward score in order to prioritize task, such as for dynamic scheduling purposes. The artificial intelligence system can more efficiently make priority decisions compared to user-based prioritization systems, and can be used with dynamic scheduling applications to better optimize the completion of computing tasks.

Groups of users may share computing resources in the form of mainframes, server farms, and other types of computer systems. However, practical considerations such as cost and space can limit the computing resources available. When the computing requirements of computing jobs or tasks exceed the available computing resources, the tasks can become backlogged.

Some scheduling systems can rely on individual users to indicate the priority and/or deadlines for completion of submitted computing tasks. However, when individuals are asked to designate a priority for computing tasks, the individuals frequently have the subjective belief that their own tasks are the most important. The scheduling systems can prioritize the completion of tasks based on the priority levels assigned by users (for example, critical, high, medium, low, and the like). However, within a classification level, scheduling systems can have difficulty prioritizing competing tasks. Sometimes, even when user designated priorities are correct, a cluster can sometimes become backlogged and have insufficient resources to process tasks regardless of their priority level, such as when users submit too many high priority tasks. In addition, user provided deadlines for task completion, can often be arbitrarily imposed by the submitting users to increase the priority of a task. As a result, the arbitrary deadlines imposed on the computing system can cause inefficient load distribution and scheduling problems. A typical scheduling system lacks the ability to perform subjective determinations of the priority of similarly classified tasks.

In some embodiments, an intelligent priority evaluator can use a reward score based on quantitative data to avoid or at least reduce the problems caused by human bias. Some embodiments disclosed herein cause counter-intuitive scheduling and resource allocation results that are the opposite of or different from what human input would achieve. Some embodiments herein disclose intelligent priority evaluators configured to prioritizes tasks submitted by various users. The intelligent priority evaluator can collect, calculate, and use various criteria to determine a reward score in order to prioritize one task over another, such as for dynamic scheduling purposes. Determining reward scores and dynamic scheduling can be performed in addition to or as a replacement for receiving user designations of priority. The intelligent priority evaluator can allocate the computing resources more efficiently compared to human designated instructions and can better prioritize the completion of more important tasks. Unlike systems implementing only categorical priorities, the reward score can be used to determine which tasks are handled even when highest-priority jobs are backlogged.

The descriptions of some figures and some example embodiments may refer to video game systems that use shared computing resources to generate, train, and retrain simulation models. The examples are provided in order to help provide an improved understanding of how some teachings discussed with respect to certain figures are linked to concepts in other figures. However, the teachings herein can be applied to scheduling any type of computer jobs for any purposes. The embodiments in the detailed description relating to models are provided by way of example and not by way of limitation.

For purposes of providing an introduction, certain aspects, advantages, and novel features have been introduced. It is to be understood that not necessarily all such aspects, advantages, and novel features of the introduction are achieved in accordance with any particular embodiment. Thus, one or more aspects, advantages, and novel features may be achieved without necessarily achieving the other aspects, advantages, and novel features introduced so far. It is also to be understood that not necessarily all aspects, advantages, and novel features have been introduced in the introduction.

Example System

FIG. 1 illustrates an embodiment of a system 100 with utilizing shared computing resources. The system 100 includes a plurality of user devices 101, a network 109, an intelligent priority evaluator 115, and available computing resources 111 such as servers 113 and cluster 123 of servers 113.

Various users can use computing devices 101 such as desktop computers, laptops, and smartphones to submit tasks through a network 109 for execution by the available computing resources 111. Users can submit individual tasks, multiple tasks, tasks to be executed or completed by a particular time, tasks that periodically repeat, and/or tasks dependent on output from other tasks. For example, a user might submit a task to execute every day as early as possible after 3 pm for the next 3 years as soon as a different task completes.

An intelligent priority evaluator 115 analyzes the submitted tasks and determines how to schedule the tasks among the available computing resources 111. In some embodiments, the intelligent priority evaluator 115 can be executed on a standalone, dedicated computer that manages scheduling and task distribution. In some embodiments, the intelligent priority evaluator can be executed by one or more processors or servers 113 of the available computing resources 111. The tasks are assigned to various servers 113 according to the schedule. In some embodiments, the computing resources can be allocated in different units, such as clusters 123 of servers 113. In various embodiments, allocation can happen at the thread level, socket level, board level, rack level, and other divisions. Other examples of allocable resources include memory, hard disk space, power, time, software licenses, and the like. The tasks assigned by the users are executed according to the allocation of computing resources 111.

The system 100 can have a limited amount of computing resources that are shared between various systems and devices. For example, the system 100 can belong to a video game company that uses simulations and models for various purposes. These can include models of anomalous behavior that are used by anti-hack programs to detect cheating, models that determine the difficulty of video game levels by tracking player progress, models used to determine the satisfaction of a user experience with a game, and the like. Each model may be used by an underlying software application. For example, an anomalous behavior model may be used by anti-hack detection software. As another example, a level difficulty model may be used by an underlying video game engine to adjust the video game level if the level is too difficult.

The underlying applications can execute in real time. For example, the anti-hack detection software may constantly run on servers to detect hackers. At the same time, feedback can be constantly received or accumulated in real time. For examples, particular memory signatures, file hashes, or other identifiers of confirmed hackers may be gathered by the anti-hack detection software each time a hacker is detected. In some cases, data samples are accumulated and/or reviewed by people. The new hacking signatures can be used to re-train the anomalous behavior model to better detect hackers.

However, executing many applications that use many different models in real time, collecting feedback as new training data to update the many underlying models in real time, and updating the many underlying models using the new training data becomes computationally expensive. This is especially true for large-scale platforms with millions of players. For example, there might be a behavior model for each particular player to determine each player's preferences, skill, and habits. It can be impractical for even powerful computing resources to retrain every model at every instance that new training data becomes available. Accordingly, an intelligent priority evaluator 115 can determine when to retrain models, which models to retrain, how often to retrain models, and the like. The intelligent priority evaluator can also use quantitative information to prioritize allocation of computing resources for the completion of computing tasks.

Intelligent Priority Evaluator

Figure 2:
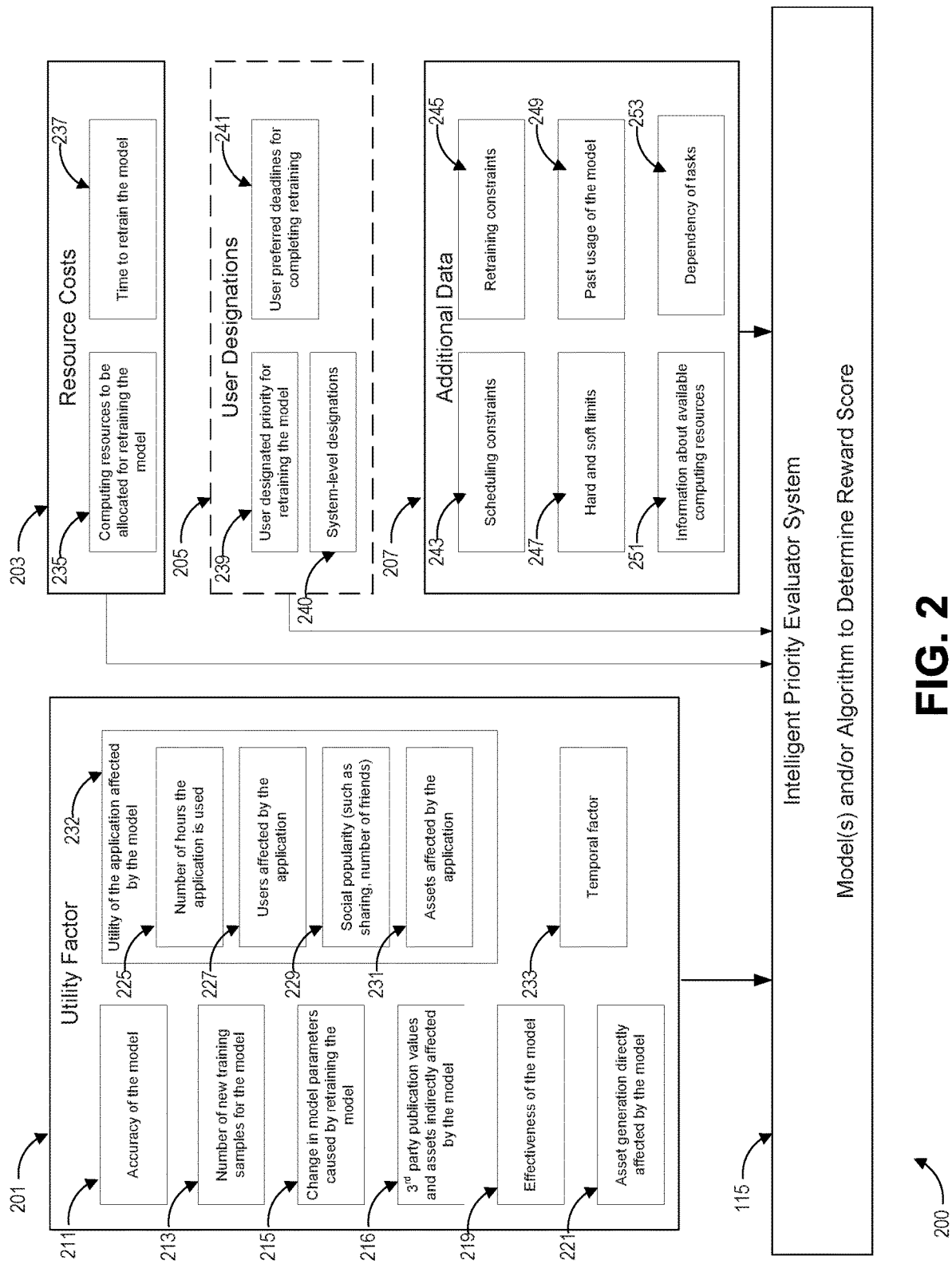
FIG. 2 illustrates an embodiment of prioritization factor inputs to a intelligent priority evaluator.

FIG. 2 illustrates an embodiment 200 of prioritization factor inputs to the intelligent priority evaluator 115. The example embodiment in FIG. 2 is discussed with respect to retraining models. When tasks are submitted to available computing resources 11 for execution, the intelligent priority evaluator can access quantitative information for each task in order to determine a reward score for each task. This can include accessing utility factors 201, resource costs 203, user designations 205, and additional data 207. The intelligent priority evaluator can use the reward scores for each task to determine a schedule that prioritizes certain tasks over other tasks. In some embodiments, the intelligent priority evaluator 115 can schedule the higher priority tasks earlier, allocate more resources to the higher priority tasks, and/or better optimize the use of the available computing resources based on the reward scores. Different combinations of inputs can be used in determining the reward scores of different types of tasks. For example, more types of inputs can be used in determining the reward score of a routinely retrained model affecting a popular video game while fewer or different types of inputs may be used in determining the reward score of a new task for internal development purposes.

The utility factors 201 can be computer-readable, quantitative data values indicative of the usefulness of performing a task, such as retraining a model. Some utility factors can be automatically generated or determined by a computer system. Other utility factors can be received from users, data stores, and/or other sources.

A utility score can be an indication representative of a plurality of utility factors. The utility score can be determined, for example, as a weighted average of the plurality of individual utility factors. In some embodiments, various algorithms can be used. In some embodiments, the utility score can be a value, such as a number between 0 and 100.

The utility factors 201 can include an accuracy of the model 211. Retraining a model that has become inaccurate with updated samples can significantly improve the utility of the model, while retraining a model that is already accurate may only cause minor, incremental improvements in accuracy. In some embodiments, the utility score can decrease with the accuracy of the model, such as by being based on an inverse or other function.

The utility factors 201 can include the number of new training samples available for the model 213. Greater numbers of new training samples available for retraining a model can help improve the model. The value of new training samples to retrain a model can be dependent on the model being retrained. For example, some models may benefit from a small number of training samples, whereas other models may require a larger number of training samples to experience the same benefit. In some embodiments, the utility score can increase with the number of samples available, such as by being based on a logarithmic, root, or other function.

The utility factors 201 can include a change in the model parameters caused by retraining the model 215. Some models can be defined by a set of parameters. Previous changes in the model parameters resulting from previous model retraining can indicate the effect of retraining the model. In some embodiments, the values of and/or changes in the model parameters over a period of time and/or over the course of one or more retraining events can be logged and used to determine the degree that the model parameters change, whether by amount, percentage, or a combination of both. In some embodiments, the utility score may increase with the degree that the model parameters changed, such as by being based on a root-means-squared or other function.

The utility factors 201 can include third party publication values and indirect assets affected by the model 216. Third parties may value providing publications (such as promotional information, advertisements, and the like), and the value may increase as a result of retraining the model. In some embodiments, the utility score may increase with increases in third party publication values and indirect assets affected by the model, such as by being based on a polynomial or other function.

The utility factors 201 can include the effectiveness of the model 219. This can include, for example, whether the model achieves its purposes over time, or whether the model has become out of sync and needs to be retrained with recent data. It can also include, for example, the number of times that a model is used. In some embodiments, the utility score can increase with increases in the effectiveness of the model and can be based on a variety of functions.

The utility factors 201 can also include the asset generation directly affected by the model 221. The asset may include revenue or profit generated by the underlying application. For example, models may be used to track individual user behaviors and preferences in order to provide an improved user experience. Retraining a model of an asset generating user has greater utility than retraining a model of a user who has not generated any assets. In some embodiments, the utility score can increase with increased asset generation and can be based on a variety of functions.

The utility factors 201 can also include the temporal factor 233. For example, more recently collected training data or data related to an underlying application that just launched or is just about to launch can have greater utility. In some cases, tasks relying on stale data can be skipped completely if a new, duplicate task is submitted with fresher data. In some embodiments, the utility score can decrease over time and can be based on a variety of functions.

The utility factors 201 can also include the utility of the underlying application that is affected by a model 223, such that the utility of retraining a model is increased if the utility of the underlying application affected by the model can be increased.

The utility of an application affected by the model can include the number of hours that the application is used 225, a number of users (active and/or inactive) affected by the application 227, a social popularity indicators of the application (such as a number of shares, contacts, reposts, likes, and the like) 229, and assets affected by the application 231. The utility of the application can be influenced by with these factors.

The various utility factors 201 can be analyzed using a weighted factor algorithm in order to determine a utility score.

The resource costs can be computer-readable, quantitative data values indicative of the amount of computing resources required to perform a task, such as retraining a model. Some resource costs can be automatically generated or determined by a computer system. In some embodiments, a task request may include specific resource allocation requirements from the user, such as a certain number of processors, a type of operating environment, number of threads, amount of memory, number of servers, amount of power, time, and the like.

A cost score can be a value representative of a plurality of resource costs. The cost score can be determined, for example, as a weighted average of a plurality of resource costs. In some embodiments, various algorithms can be used.

The resource costs 203 can include the amount of computing resources (such as the number of processors, a type of operating environment, a number of threads, amount of memory, number of blades, number of servers, amount of power, time, and the like) required to retrain a model 235. This can be determined based on the code for retraining the model, the amount of new training data available, and the like. Alternatively, or additionally, this can be based off of previous amounts of resources used during previous instantiations of retraining the same or similar models. The resource costs can increase as the computing resources to be allocated for retraining the model increases, and can be based on a variety of functions.

The resource costs 203 can also include an amount of time to retrain a model. This can be determined based on the code for retraining the model, the amount of new training data available, and the like. Alternatively, or additionally, this can be based off of previous amounts of time used to retrain the model. The resource costs can increase as the amount of time to be allocated for retraining the model increases, and can be based on a variety of functions.

The user designations 205 can include a user designated priority for retraining a model 239 (for example, as shown in FIG. 2) and user designated preferred deadlines for completing a task 241. In some embodiments, user designated inputs can be omitted. When users provide preferred deadlines, the preferred deadlines can be verified against when the results of executed tasks have actually been accessed.

The user designations 205 can include system-level designations 240. In some embodiments, some user designations 205 can be provided at a group level. For example, all tasks submitted from a specific machine, from a group of users, for particular types of models, belonging to a particular pipeline, relating to certain underlying applications or games, and other group levels can have a specific priority. A system administrator or other person can set group priorities. The group priorities can be automatically applied when a task is submitted without requiring input from individual users. In some embodiments, a plurality of priority designations affected by a plurality of group levels can be combined to determine an overall priority designation. Group level designations can provide a mechanism for initial prioritization determinations that can be helpful for seeding a computing system with information before many tasks are submitted. Furthermore, group level designations can provide human-level input. In some situations, such as before a new game launches, administrators can increase the priority of tasks relating to the new or not yet launched game, even if some metrics such as popularity may not accurately reflect of the actual value of the game because it is too new or has not yet been released. These types of rules are not necessarily provided by the user submitting a task, but can be managed at the system-level by an administrator.

The additional data 207 can include scheduling constraints 243. The scheduling constraints can include, for example, server downtime. In some embodiments, hard task completion deadlines can be received from users. The scheduling constraints can also include, for example, scheduling constrains based on future schedules, repeated task submissions, patterns of task submissions, and/or predictions of task submissions. For example, a user may have routinely scheduled a high reward task at noon every Friday. Based at least in part on this pattern, it can be predicted that the user will continue to schedule high reward score tasks at noon every Friday, and the intelligent priority evaluator system can reserve a spot for the high reward task for future Fridays at noon or avoid scheduling lower reward score tasks around Fridays at noon if computing resources would be insufficient to run both the lower reward score task and the predicted high reward score task. Additionally, or alternatively to using schedule restraints to determine reward scores, scheduling restraints can be used for scheduling tasks after a priority score is determined.

The additional data 207 can also include retraining constraints 245. Retraining constraints can include minimum execution limits. For example, a low priority, rarely used model may never get retrained due to other higher-priority tasks, but a retraining constraint can force the rarely used model to be retrained at least once every six months. Retraining constraints can also include maximum execution limits. For example, a model may not be allowed to be retrained more than a certain number of times per day. Retraining constraints can also include minimum qualifying criteria for task execution. For example, there may need to be a minimum number of new training data samples available for a model to be retrained. Retraining constraints can include minimum reward score limits. For example, a model will not be scheduled for retraining unless retraining the model will yield a minimum reward score. As another example, hard limits can include a minimum number of new training samples for retraining a model. If a user attempts to retrain a model with only one new training data sample while the system resources are busy, then the user's attempt to schedule the task can be denied for failure to provide a minimum number of new training data samples.

The scheduling constraints 243 and retraining constraints 245 can be used to affect the reward score, or implemented as separate rules. For example, as a hard deadline nears for retraining a particular model, the utility score for retraining that model can increase rapidly (such as according to a higher power polynomial function, and exponentially increasing function, and the like) such that it will be dynamically rescheduled to the front of the line. As another example, as a hard deadline nears for retraining a particular model, a rule can be implemented to override any reward score determination and move the particular model retraining to the front of the queue.

The additional data 207 can include hard and soft limits 247 for retraining the model. For example, there can be a minimum limit for a number of training samples available before a model can be retrained. As another example, a model may be allowed to execute no more than twice a day, or no more than once in a certain amount of time. As another example, administrators can set quota limits, such as the amount of tasks that an individual or user group can submit per day. Other quota limits can include allocations of computing resources, number of simultaneous jobs, permitted and restricted time windows for high and low reward tasks, and the like. Hard limit implementations can be strictly enforced. Soft limit implementations can cause the reward score to be lowered if the limit is violated.

The additional data 207 can include the past usage of the model 249. Past usage can include who uses the retrained model, the frequency that the model is used, and when the model outputs or results are used. For example, a model retraining may complete and generate a report that is read by C-level executives or people high up in the organization structure, which will increase the reward score. As another example, a retrained model may be regularly queried at certain times of a day, such that the reward score can have a lower priority until the regular querying time approaches. As another example, it can be determined that an anti-hacking model that is used to detect hackers in an online video game that is played by many players during the daytime. However, due to very few players playing at night, retraining of the anti-hacking model can delayed until daytime approaches.

In some embodiments, the additional data 207 can override a user designated, preferred deadline. For example, a user may designate an arbitrary deadline for retraining a model such as 10 pm for various reasons, but the system can determine that no one routinely accesses the model until 8 am the next day, and decide to override the user designated deadline. In some embodiments, who uses the results, the frequency that the model is used, and when the model outputs or results are used 249 can be included as utility factors.

The additional data 207 can include information 251 about the available computing resources 111. Each change in the available computing resources can cause the system to reallocate the resources in a new schedule. The intelligent priority evaluator system 115 can also use information about available computing resources 111 to reduce the reward score for a task that requires computing resources exceeding currently available capacities and for tasks that, when executed, would lower remaining computing resources to levels likely to prevent additional tasks from executing.

The available data 207 can include dependency of tasks 253. Some tasks may need to be completed before other tasks can complete, and the overall time of the longest dependency chains can be determined in order to meet deadlines. The reward score of an initial task can be based, at least in part, on the utility of one or more dependent tasks. For example, an initial task might retrain an initial model of relatively small utility, but the initial model generates an output that is used by important, subsequent tasks that depend on the initial task, where the subsequent tasks have high utility. Accordingly, the reward score of the initial task can be increased based at least in part on the high utility of the subsequent dependent tasks. Various embodiments can use dependency to influence the reward score in various ways. For example, in some embodiments, dependency can be applied to affect utility factors of an initial task based on the utility of subsequent dependent tasks. In some embodiments, dependency can be applied to affect the reward score of an initial task based on the reward scores of subsequent dependent tasks. In some embodiments, an initial task can be grouped with dependent tasks for the purposes of determining an overall reward score and/or utility scores. Dependency can also be applied at various levels to the other inputs shown in FIG. 2.

One or more input models can be used in order to generate the inputs 201, 203, 205, 207 to the intelligent priority evaluator system 115. For example, input models can be used to determine utility factors and resource costs. An example resource cost input model can estimate the computing resources and/or time required to retrain a target model based on the lines of code in the target model; the number of loop repeats in the target model; previous executions of similar tasks with similar coding, method names, directory locations, inputs, outputs, and target model type; the underlying game affected by the target models, and the like. The resource cost input model can use data from tasks executed in the past, such as the amount of time and computing resources used in for retraining the target model, in order to predict the resource costs of recently submitted tasks and/or tasks scheduled for executing later.

As another example, an accuracy input model can be used to determine how much the accuracy of a target model will improve if the target model is retrained. The accuracy input model can track the accuracy of the target model by comparing the target model outputs to actual values. The accuracy input model can also track changes in the accuracy of the target model when the target model is retrained by determining changes in parameters of the target model 215. The accuracy input model can also account for the amount of training samples used to retrain the target model 213 and the time elapsed before retraining the target model. The accuracy input model can then use similar inputs to estimate a change in the accuracy of a target model if the target model were to be retrained with a certain number of training samples.

In addition to the resource cost model and the accuracy input model, any of the one or more input models can be used for some or all of the inputs to the intelligent priority evaluator system shown in FIG. 2. Further, as discussed below with respect to FIG. 7, these input models can be retrained with feedback, thereby improving the ability of the intelligent priority evaluator system 115 to determine a reward score.

Any of the input factors shown in FIG. 2 can be measured as a standalone quantity and/or measured relative to retraining a model. For example, the accuracy of the model can be measured as a standalone number, such as 90%. However, the accuracy can also be measured as an improvement that results from retraining a model, such as a 10% improvement from 80% to 90% after the last time that a model was retrained.

The intelligent priority evaluator 115 can receive the utility factors 201, resource costs 203, user designations 205, and additional data 207 to intelligently determine a reward score. In some embodiments, different combinations of the inputs shown in FIG. 2 can be used. In some embodiments, various inputs shown in FIG. 2 can be omitted. In some embodiments, the user designated inputs can be omitted. In some embodiments, different combinations of the inputs will be used or omitted based on the task that is being evaluated. For example, the criteria used for evaluating the reward for retraining a model can be different from the criteria for evaluating the reward for number crunching a spreadsheet.

In some embodiments, the intelligent priority evaluator 115 can use a weighted factor algorithm or other algorithm to determine a reward score based on the utility factor and the resource costs. The various utility factors can be weighted to determine a utility score, and the various resource costs can be weighted to determine a cost score. Multipliers can be determined based on additional data 207. In various embodiments, the multipliers, scores, and weights can be determined based on any combination of inputs shown in FIG. 2. In some embodiments, the utility score can be reduced by the cost score to determine a reward score. Some example algorithms can include, for example, Reward Score=Multiplier×(WeightA×Utility Score)−(WeightB×Cost Score). This can also include, for example, Reward Score=(WeightA×Utility Score)÷(WeightB×Cost Score). Another example algorithm for managing model retraining includes Reward Score=(Utility per new training data sample×number of training data samples)÷(computing resources required per training data sample×computing time required per training data sample). This can also include other algorithms, including artificially generated algorithms. In some embodiments, the user designations and additional data can affect the reward score. In some embodiments, machine learning and artificial learning techniques can use multiple reward generation models and refine the models based on feedback.

Accordingly, various embodiments of the intelligent priority evaluator can use quantitative data to determine a reward score for each task to be scheduled for execution by the shared computer resources. Some of the embodiments can feature various improvements in comparison to using human provided priority designations that are not quantified by historical data.

For example, subjective users may impose, based on artificial reasons or based on herd mentality, to have tasks done by 9 a.m. the next day, and furthermore, on a priority scale of 1 to 100, everyone might rank their own tasks as 100. These users do so without discussing with each other which tasks are the most important. Indeed, it is impractical for individual people to examine an entire database of quantified data before submitting a task to determine fact such as which users access the results of tasks at what times. Nor are people in the general habit of determining how many people or programs read or access the results or reports from model retraining in order to compare their own tasks to those of others before submitting a task for execution. Nor are people in the habit of monitoring for changing conditions to automatically re-evaluate their prior scheduling decisions in response to the changing conditions. In contrast, some embodiments can account for all of these quantitative metrics not normally performed by people in order to determine a data-driven reward score to use for scheduling. Such embodiments can determine, based on the relevant metrics such as the utility factor, resource costs, user designations, and additional data, how to maximize a system's overall rewards instead of focusing on individual priorities. Accordingly, such systems can determine, for example, that a task due in 10 hours and takes only 30 minutes to complete can be pushed back toward the deadline, even if users indicate preferences for earlier completion times.

As an example of avoiding herd mentality, it can be commonplace for users to schedule large tasks into static queues at the same time, such as the end of the day. This can cause servers to overload around those 7 pm or so, even though the users will not actually check the results of their tasks until morning of the next business day. Additionally, this can cause false reports of insufficient server capacity because there are insufficient resources at 7 pm to timely complete tasks, causing businesses to perform unnecessary upgrades. In contrast, by identifying which results of model retraining are not ordinarily accessed until the morning, an intelligent priority evaluator can determine that tasks are timely completing before the morning, so there are no false reports of insufficient resources, and businesses do not wastefully upgrade the shared computer resources. The intelligent priority evaluator can better identify instances where high-priority tasks scheduled for certain times actually need to be completed at those times but cannot due so due to a lack of computing resources.

In some embodiments, when computing resources may run at capacity, the computing resources can be upgraded to expand the capacity. Practical considerations such as cost and space can limit the amount of upgrades that can be performed. The techniques disclosed herein with respect to reward scores can similarly be used to determine which computing resources to upgrade to maximize rewards. This can include, for example, analyzing the reward scores of different groups of users and upgrading the computing resources used by the groups of users with the highest reward scores.

In some embodiments, a compute cluster can be dynamically auto-scaled to increase or decrease capacity. Sometimes, these compute clusters can be rented and auto-scale to increase capacity for an additional fee. The techniques disclosed herein with respect to reward scores can similarly be used to determine whether to increase or decrease capacity to maximize rewards. For example, if a compute cluster has several backlogged jobs with high reward and at risk of missing deadlines, a high reward score can be used in making a determination to scale the cluster up, at least temporarily, and then scale back down when the reward scores of jobs on the compute cluster decrease.

Example Uses

Figure 3:
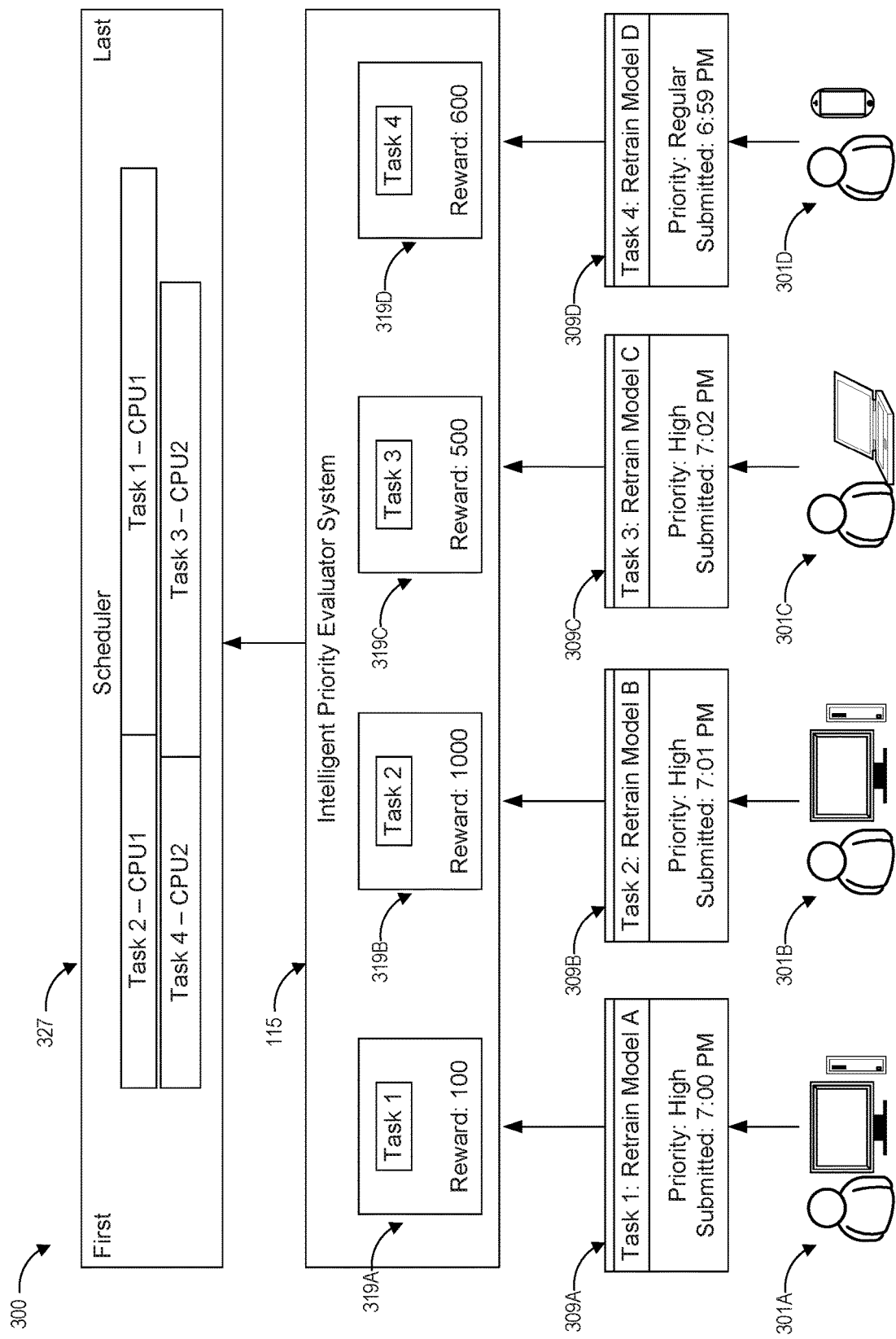
FIG. 3 illustrates an embodiment of a system for scheduling tasks based on intelligently evaluated priorities of the tasks.

FIG. 3 illustrates an embodiment of a system 300 for scheduling tasks based on intelligently evaluated priorities of the tasks. Users 301A-301D submit tasks 309A-309D respectively. An intelligent priority evaluator 115 determines reward scores 319A-319D for each task, and a scheduler 327 uses the reward scores to generate a schedule for the tasks in the order shown.

Users 301A-301D may submit respective tasks 309A-309D to be executed by limited computing resources (such as the available computing resources 111 in FIG. 1). In the example embodiment of FIG. 3, the tasks 309A-309D are similar in that the tasks are all to retrain a model. However, other embodiments can feature other types of computer tasks such as decryption tasks, report generation, executing advanced algorithms, and the like.

The various users can submit tasks associated with their role in an organization. For example, user 301A might be in charge of hacking prevention. The user 201 may submit a task to retrain a hacking prevention model "A" at the end of the workday based on new data acquired by an underlying hacking detection system, which may have been gathered over the past hours, days, or weeks, or longer. User 301A believes that hacking detection is important and assigns the task 309A a high priority.

User 301B might use a predictive model "B" to analyze the effects of friends, sharing, likes, and other trends in order to promote products. Based on new, recent trending activity, user 301B might submit a task 309B to retrain the predictive model "B" and subjectively assigns a high priority to the task 309B.

Similarly, user 301C might assign a high priority based on a belief that user 301C's own scheduled job (in this example, retraining model "C") is very important. For example, user 301C may have an artificial deadline imposed by a boss. User 301C might submit a task 309C to retrain a model at the end of the workday.

Some users, such as user 301D, might submit a regular priority task 309D (in this example, retraining model "D") to be executed by the shared computing resources. User 301D submits the task with medium priority. However, unbeknownst to user 301D, retraining model D may actually be relatively important.

The various priority designations of users 301A-301D provide a limited degree of utility, but may not be entirely accurate. This is because each person may tend to believe that their own tasks are the most important. At other times, some users, such as user 301D, may underestimate the importance of their tasks. Such problems might occur, in part, because the users do not consult with other members of the organization, especially those in other departments, to determine the relative importance of their jobs to the organization as a whole before submitting a task for execution, especially when all tasks are similar (such as retraining models). In addition, such problems might occur because the users do not and, generally, cannot quantitatively analyze the impact of their tasks on the organization. Instead, each user may make a subjective determination based on the user's own biases and based on demands (such as artificial deadlines imposed by a boss).

Each time that a task 309A-309D is submitted for execution, an intelligent priority evaluator 115 can analyze the submitted task, determine a reward score, and dynamically schedule the allocation of computing resources based at least in part on the determined reward score. The intelligent priority evaluator 115 can determine a reward score based on various prioritization factors, such as, for example, a time that the tasks were submitted, a user designated priority of a task, a type of task (for example, system tasks, model training, and the like), and/or other prioritization factor. The intelligent priority evaluator 115 can additionally gather quantitative data to determine the utility score and cost score of each task. In some embodiments, the intelligent priority evaluator can automatically determine the reward score based on the quantitative data independent of user-provided priority designations (such as high, regular, or low priority), thereby substituting a data driven determination in place of subjective prioritization.

In the example embodiment shown in FIG. 3, the intelligent priority evaluator 115 determined that the task 1 has a reward score of 100 points 319A, that task 2 has a reward score of 1000 points 319B, that task 3 has a reward score of 500 points 319C, and that task 4 has a reward score of 600 points 319D.

The intelligent priority evaluator 115 then provides rewards scores to a scheduler 327 to schedule the tasks to be executed on the shared computing resources. The reward scores can be dynamically recalculated and the schedule can be dynamically re-arranged based on the reward scores each time that a reward score is adjusted, a new reward score is determined, when there is a change in the availability of the computing resources, and/or based on the occurrence of other events. In the illustrated example, scheduler 327 provides the scheduling information for the four tasks. First, task 2 is scheduled on CPU1. When task 2 completes, task 1 is scheduled on CPU1. Task 4 is scheduled on CPU2 at the same time as task 2. When task 4 completes, task 3 is scheduled on CPU2.

The intelligent priority evaluator may produce some counter-intuitive results. For example, although task 1 was submitted before task 2, task 2 is scheduled ahead of task 1. This can be due to a variety of factors, including the quantitative factors used to determine the reward score. As another example, task 4 of a regular user designated priority is scheduled ahead of task 3 and task 1, which has high user designated priorities. Again, this can be due to quantitatively determined factors affecting the reward score.

Examples of Determining Reward Scores

Figure 4:
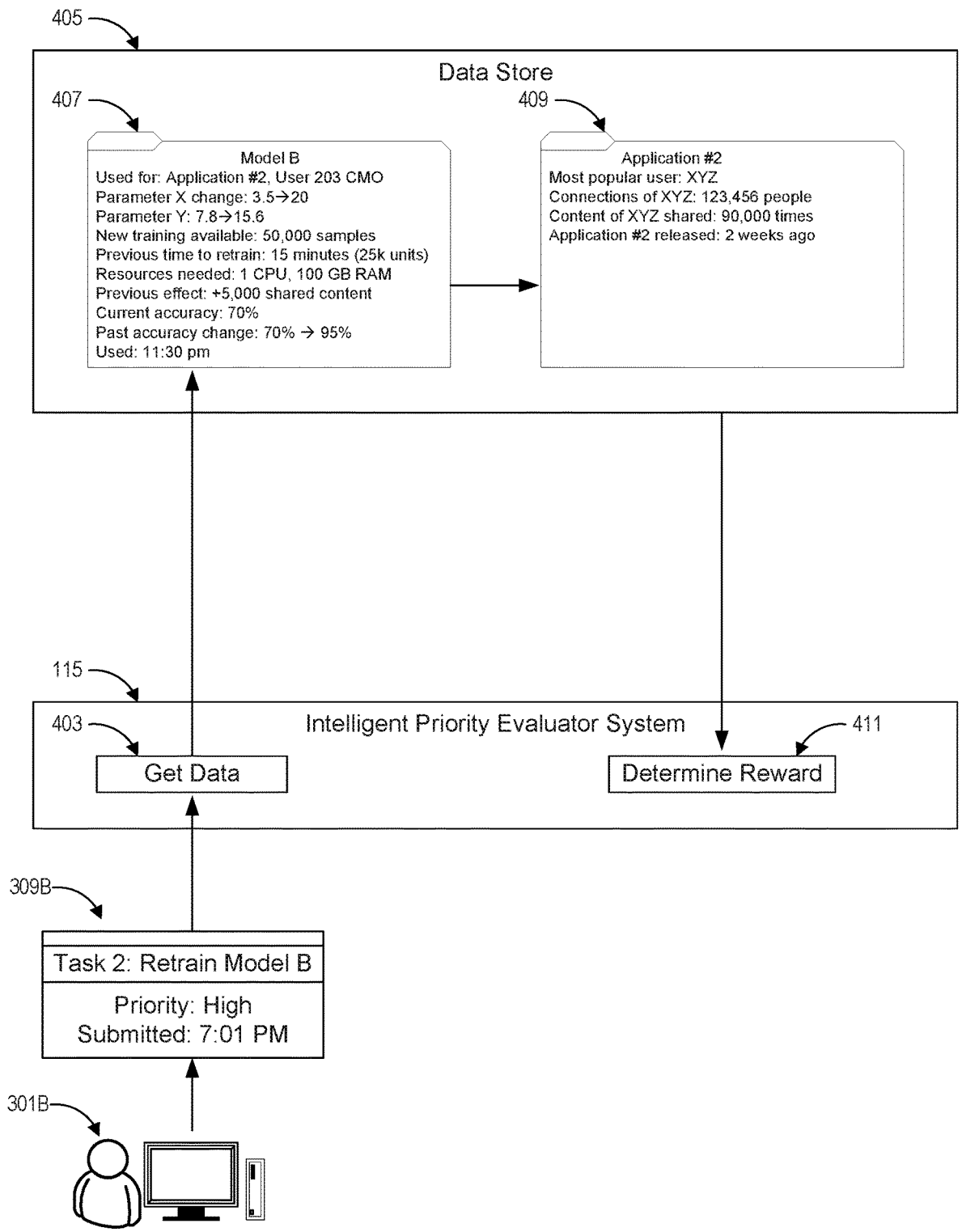
FIG. 4 illustrates an embodiment of a system for using quantitative data to intelligently evaluate the priority of a task.

FIG. 4 illustrates additional details of using quantitative data to intelligently evaluate the priority of a task 2 from system 300 of FIG. 3. The user 301B submits a task 309B to retrain Model B to be evaluated by the intelligent priority evaluator 115, which determines a relatively high reward score of 1000 compared to the other reward scores shown in FIG. 3.

In FIG. 4, the intelligent priority evaluator 115 gets data 403 from a data store 405. The data store can include any data storage device or data storage system, such as a hard drive, solid state drive, ROM, RAM, database, and the like. The data can include data 407 related to Model B and data 409 related to the application that uses Model B. The intelligent priority evaluator then uses the data 407, 409 to determine a reward 411.

The data 407 related to Model B can include any combination or permutation of prioritization factor inputs from FIG. 2, such as who or what application uses the model. In the illustrated example, Model B is used by Application #2 and has been used before by user 203, who is a chief marketing officer (CMO). Accordingly, data related to application #2 will be accessed in order to determine a utility score. In addition, according to the factors discussed with respect to FIG. 2, the reward score in FIG. 4 can be adjusted based on a user's job title, for example, a reward score may be increased because the job title is CMO.

Model B may have certain parameters, such as parameters X and Y, that make up or define the model. The data 407 related to Model B can include the changes in the values of the parameters, such as parameters X and parameter Y changing by substantial amounts as a result of when Model B was last retrained. Accordingly, the utility score can reflect that significant utility is gained when Model B is retrained because the model's parameters substantially changes, as previous discussed with respect to utility factor 315 in FIG. 2.

The data 407 related to Model B can include information about the number of new training samples available to retrain Model B, which FIG. 4 shows is a relatively high number of samples. Accordingly, the utility score can reflect that significant utility will be gained by retraining Model B because there are lots of new training data samples available, such as previously discussed with respect to utility factor 313 in FIG. 2.

The data 407 related to Model B can indicate the resource costs of retraining Model B. In the past, based on half of the number of new samples, Model B took 15 minutes to retrain on one processor and used 100 gigabytes of random access memory (RAM). Accordingly, it can be estimated that to retrain the current model with double the amount of new resources, it may take twice as long given the same resources, or that it may take half as long if twice the computation resources are allocated, or other similar estimates based on principles of computing. For any estimate, the resource cost as quantified by time, processors, memory, and the like can be input into an algorithm, such as a weighted factor equation, in order to determine a cost score.

The data 407 related to Model B can indicate the previous effect of retraining the model. In the past, the CMO was able to use simulations to promote products and increase the number of social media sharing occurrences by a relatively large number of occurrences. The utility score can reflect that significant utility will be gained by retraining Model B because social media promotion will be more effective, such as previously discussed with respect to utility factor 319 in FIG. 2.

The data 407 related to Model B can indicate that the current accuracy of the model is out of sync, but that past model retraining has caused relatively large improvements in accuracy. This time, the intelligent priority evaluator can determine that at least a similar improvement will result when Model B is retrained with an even larger number of samples as compared to past retraining events. Accordingly, the utility score can reflect that significant utility will result from retraining the model to improve the model accuracy, such as previously discussed with respect to utility factor 311 in FIG. 2.

The data 409 for the application #2 that uses or is affected by model B also affects the utility score, as previously discussed with respect to utility factor 323 in FIG. 2. In FIG. 4, application #2 can be a video game that was recently released. One of the most popular players in the game is XYZ has a relatively large number of connections and had his content shared over a relatively large amount. Accordingly, the utility score can reflect that Model B is used by or affects a recently released, highly popular application.

At block 411, based on an analysis of the data collected from data store 405, the intelligent priority evaluator determines a relatively high reward score of 1000.

Figure 5:
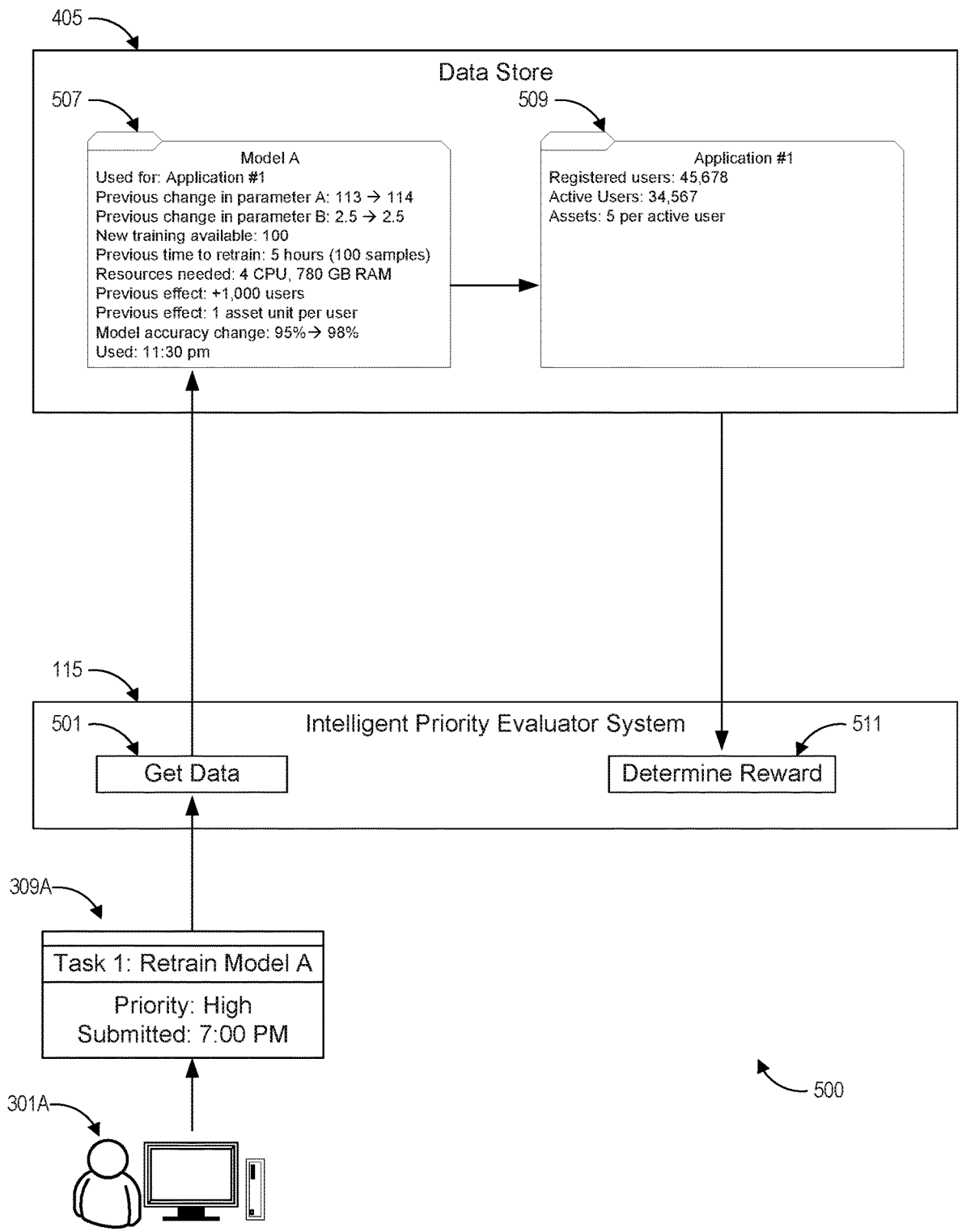
FIG. 5 illustrates an embodiment of a system for using quantitative data to intelligently evaluate the priority of a task

FIG. 5 illustrates additional details of using quantitative data to intelligently evaluate the priority of a task 1 from system 300 of FIG. 3. User 301A submits a task 309A to retrain Model A to be evaluated by the intelligent priority evaluator 115, which determines a relatively low reward score of 100 compared to the other reward scores shown in FIG. 3.

In FIG. 5, the intelligent priority evaluator 115 gets data 501 from a data store 405. The data can include data 507 related to Model A and data 409 related to the application that uses Model A. The intelligent priority evaluator then uses the data 407, 409 to determine a reward 411.

The data 507 related to Model A can include information such what application uses or is affected by the model. In the illustrated example, Model A affects application #1. Accordingly, data related to application #1 will be accessed in order to determine a utility score.

Model A may have certain parameters that make up or define the model. The data 507 related to Model A can include the changes in the values of the parameters, such as parameter A changing by a relatively small amount (both as a percentage and as a difference), and parameter B remaining constant when Model A was last retrained. Accordingly, the utility score can reflect that little additional utility is gained when Model A is retrained because the model's parameters barely change, as previous discussed with respect to utility factor 315 in FIG. 2.

The data 507 related to Model A can include information about the number of new training samples available to retrain Model A, which FIG. 5 shows is a relatively low number of samples. Accordingly, the utility score can reflect that little additional utility will be gained by retraining Model A because there are few new training data samples available, such as previously discussed with respect to utility factor 313 in FIG. 2.

The data 507 related to Model A can indicate the resource costs of retraining Model A. In the past, based on the same number of samples, Model A took a relatively large amount of resources to retrain. Accordingly, retraining Model A with the same number of new training data samples will similarly require substantial computing resources. The resource cost as quantified by time, processors, memory, and the like can be input into an algorithm, such as a weighted factor equation, in order to determine a cost score.

The data 507 related to Model A can indicate the previous effect of retraining the model. When the model was last retrained, the application #1 gained a relatively low number of new users, who, on average, each contribute an relatively low asset unit. Accordingly, the utility score can reflect that relatively little utility will be gained by retraining Model A because few new users and few new assets will likely be gained, such as previously discussed with respect to utility factor 319 in FIG. 2.

The data 507 related to Model A can indicate that relatively small accuracy gains resulted from the last time that the model was retrained with the same number of samples. This time, the intelligent priority evaluator can be estimate that a similar or smaller improvement will result when Model A is retrained due to diminishing returns as the accuracy approaches 100%. Accordingly, the utility score can reflect that little utility will result from retraining the model to improve the model accuracy, such as previously discussed with respect to utility factor 311 in FIG. 2.

The data 509 for the application #1 that uses or is affected by model A also affects the utility score, as previously discussed with respect to utility factor 323 in FIG. 2. In FIG. 5, application #1 has a relatively small number of registered users and active users. Additionally, each active user generates relatively few units of assets. Accordingly, the utility score can reflect that Model A is used by or affects an application that generates assets.

At block 511, based on an analysis of the data collected from data store 405, the intelligent priority evaluator determines a relatively low reward score 511 of 100.

Example Schedule and Implementation

Figure 6:
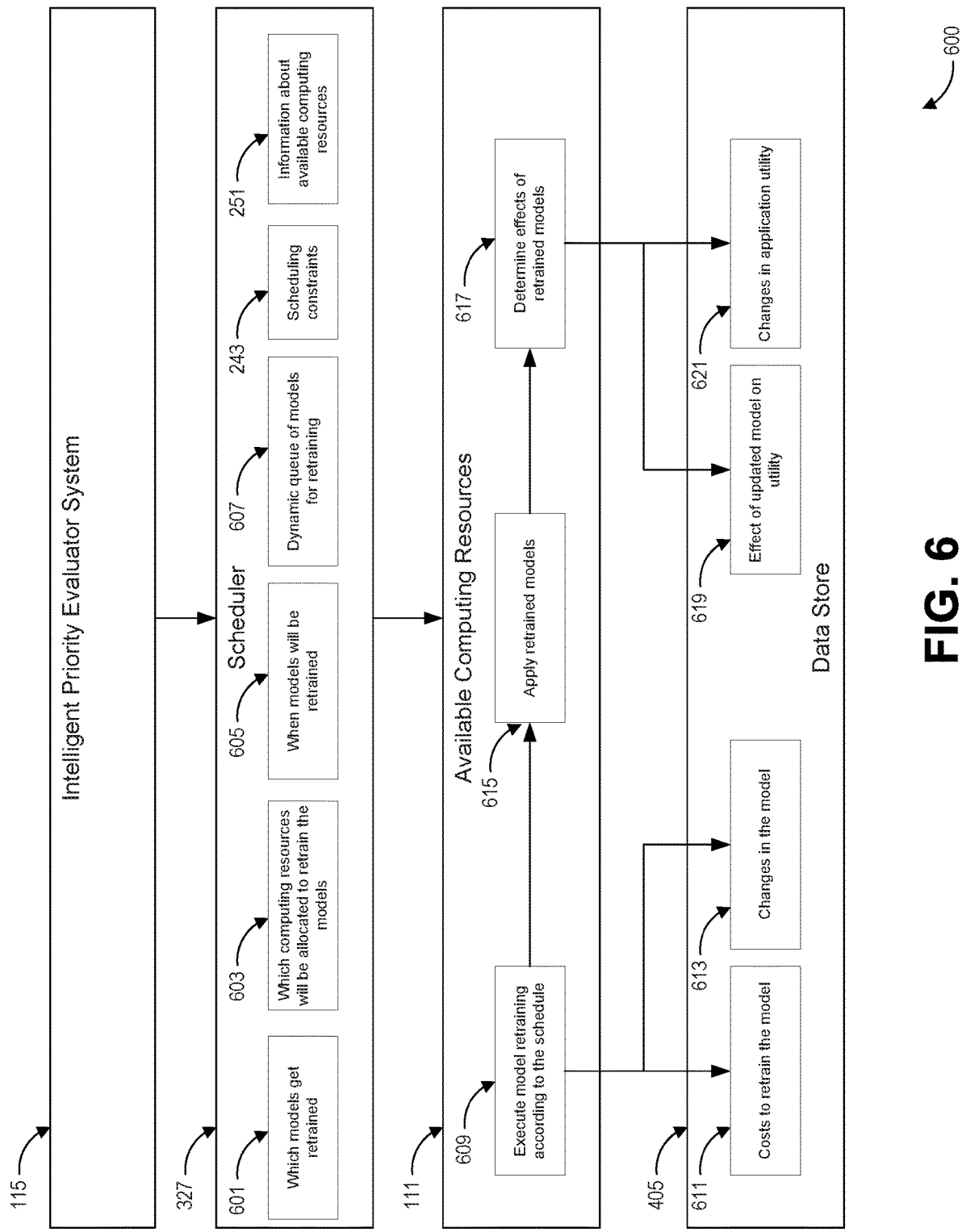
FIG. 6 illustrates an embodiment of a system executing scheduled tasks and generating feedback data.

FIG. 6 illustrates an embodiment of a system executing scheduled tasks and generating feedback data. In some embodiments, FIG. 6 can continue from FIG. 2. The scheduler 327 generates a schedule of tasks. The available computing resources 111 execute the tasks according to the schedule. Feedback data is collected stored in a data store 405 for the intelligent priority evaluator to use in making future decisions.

The intelligent priority evaluator 115 can determine reward scores for the various tasks and provide the reward scores to a scheduler 327 to arrange a schedule based on the reward scores. The example in FIG. 6 continues a discussion relating to training models, but it should be understood that the teachings disclosed herein can extend to any scheduled tasks.

The scheduler 327 can access some additional data 207, such as scheduling constraints 243 and information about available computing resources 251 to generate a schedule.

The scheduler 327 can use an identification of models to retrain 601 to generate the schedule. Models can be retrained upon request if resources are available, but in some instances where resources are limited, hard limits can be enforced so that certain tasks are denied.

The scheduler 327 can use an identification of computing resources that will be allocated to retrain the models 603 to generate the schedule. For example, as shown in FIG. 2, different CPU's can be assigned to different tasks. The computing resources can be allocated at different levels such as the thread level, processor level, server level, rack level, cluster of racks, and the like. Other resources for allocation can include memory, power, storage space, software licenses, and the like.

The scheduler 327 can use an identification of when models will be retrained 605 to generate the schedule. The timing can be absolute, such as, a time of day (such as, for example, scheduling a task to run at 8:00 pm) or relative, such as in relationship to other tasks (such as, for example, scheduling a second task to run when a first task completes).

The scheduler 327 can use a dynamic queue of models for retraining 607 to generate the schedule. The queue can be dynamically adjusted in real time in response to various changing conditions. For example, the queue can be dynamic readjusted based on an updated availability of resources, when new training data samples are collected, when new feedback data is collected, when new tasks are submitted by users for scheduling, and the like. Dynamically adjusting the queue can also include recalculating the reward score for any queued items affected by changing conditions, and then rescheduling the queue based on the recalculated reward scores. Dynamically adjusting the queue can also include preemptively killing running tasks or scheduled tasks that are about to run to make room for tasks with higher reward scores. For example, a low reward score task might be scheduled to run right before the submission of a high reward score task. The low reward score task can be terminated and rescheduled for a later time, while the high reward score task can run in the place of the low reward score task.

The available computing resources 111 execute the model retraining tasks according to the schedule. As the models are retrained, cost data and some utility factors can be collected and stored in the data store 405 as feedback data. For example, the resources required to retrain a model and the time required to retrain the model can be stored as costs of retraining the model 611 in the data store 405. This can include, for example, determining before-and-after-training parameters for the model in order to determine how much the model changes 613.

In some embodiments, the available computing resources 111 can apply 615 the retrained models to their underlying applications. For example, an anti-hack model will be used by an anti-hacking program to detect hackers. As another example, other models may generate reports or be used in various other ways. In some embodiments, the updated models can be provided to the underlying applications for execution. In such embodiments, the computing resources used for execution of the model may be dedicated computing resources that are not included in the pooled available computing resources 111.

The available computing resources 111 can determine 617 the effects of the retrained models. The effects of retraining the model on the model itself 619 and on the underlying application 621 can be stored in the data store 405 as feedback data. This can include, for example, whether the model parameters changed. This can also include, for example, whether the expected effect of the model was realized when the model was used.

Example Methods

Figure 7:
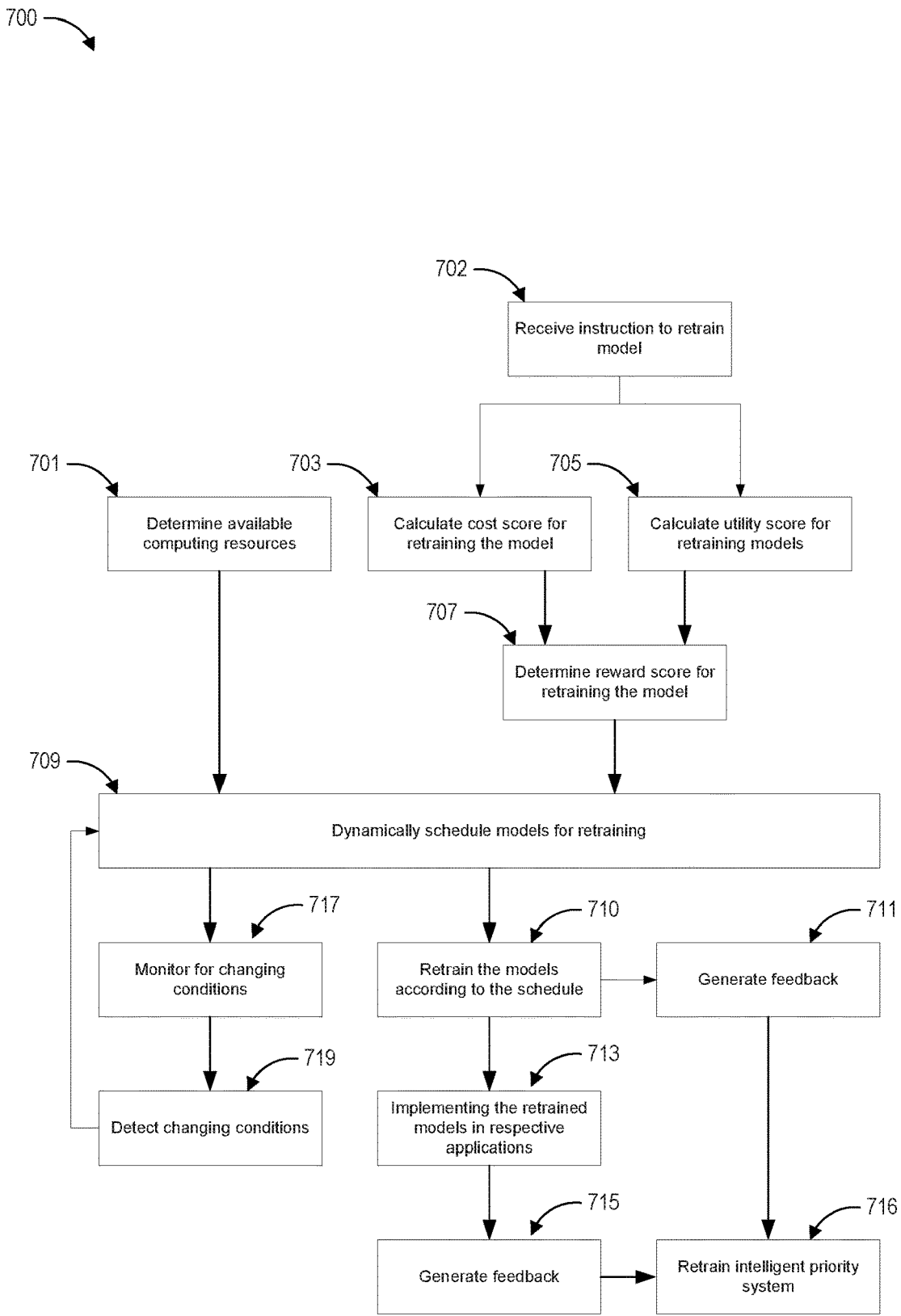
FIG. 7 illustrates a flowchart of an embodiment of a method for computers to determine task priority and schedule tasks.

FIG. 7 illustrates a flowchart 700 of an embodiment of a method for computers to determine task priority and schedule tasks. The method 700 can be implemented by any system that can schedule tasks for execution by shared computing resources. The process 700, in whole or in part, can be implemented by, for example, an intelligent priority evaluator 115 of FIG. 1, the available computing resources 111 of FIG. 1, or other systems. Although any number of systems, in whole or in part, can implement the process 700, to simplify discussion, the process 700 will be described with respect to particular systems.

At block 701, the system determines the amount of computing resources available. The amount of computing resources can include, for example, a certain number of processors, a type of operating environment, number of threads, amount of memory, number of servers, amount of power, storage space, software licenses, and the like. The amount of computing resources can include resources taken at the thread level, processor level, server level, rack level, cluster of racks, and the like. The computing resources can include the available resources allocated to a particular type of task, such as retraining models. The amount of computing resources available can be determined, for example, by querying the status of the computing resources, by tracking which of the computing resources are in use, and the like.

At block 702, an instruction to retrain a model is received. In some embodiments, the instruction can be received from a user, and the instruction can additionally include user designated inputs parameters such as a user designated priority. In some embodiments, the instruction to retrain a model can be automatically generated for models based on various retraining criteria. For example, a model may be automatically submitted when the accumulated data associated with the model, such as a number of new training samples, exceeds a threshold value.

At block 703, the cost score for retraining the model is calculated. The cost score can be a number that is determined, based at least in part, on the resource costs for retraining a model, for example, as discussed with respect to resource costs 203 of FIG. 2, the resource costs in FIG. 4, and the resource costs in FIG. 5. This can include a weighted average resource costs or other algorithm.

At block 705, the utility score for retraining the model is calculated. The utility score can be a number that is determined, based at least in part, on utility factors relating to a model or relating to an application that uses the model, for example, as discussed with respect to utility factors 201 of FIG. 2, the utility factors in FIG. 4, and the utility factors in FIG. 5. This can include a weighted average of utility factors or other algorithm.

At block 707, the utility score and the cost score are used to determine a reward score for retraining the model, for example, as discussed with respect to FIG. 2, FIG. 4, and FIG. 5. In some embodiments, user designations and/or other data can also be used. The reward score can be a number indicative of a relatively priority that a task be completed, and can be based at least in part on a utility (as represented by a utility score) and a cost (as represented by a cost score).

At block 709, the model is dynamically scheduled to be retrained based at least in part on the reward score. This can include computing resources. The computing resources can be allocated such that the tasks associated with the highest reward scores will be allocated earlier and/or allocated more resources. In some embodiments, this can also include scheduling based on user designations and/or additional data. In some embodiments, dynamically scheduling models can include reevaluating reward scores for the already queued tasks. In some embodiments, dynamically rescheduling models can include reevaluating reward scores for currently executing tasks and killing one or more currently executing tasks to make room for higher reward score tasks. In some embodiments, if a user designation was provided as part of block 702, the user designation can sometimes be superseded by other factors.

At block 710, the allocated resources can retrain the models according to the schedule. The available resources can receive instructions from the intelligent priority evaluator 115 indicating which tasks to execute with which resources.

At block 711, feedback from retraining the models can be generated and stored in a data store. The feedback can include, for example, some of the information discussed with respect to FIGS. 2 and 6.

At block 713, the retrained models can be implemented in their respective applications. For example, an anti-hacking model that has been retrained with recent samples of hacking behavior can be implemented by an anti-hacking program.

At block 715, feedback from the applications can be generated and stored in a data store. The feedback can include, for example, some of the information discussed with respect to FIGS. 2 and 6. For example, an anti-hacking program may generate feedback about whether or not the anti-hacking program is more effective at detecting hackers as a result of using a newly retrained anti-hacking model.

At block 716, feedback from blocks 711 and/or 715 can be used to retrain the intelligent priority input system, which can include retraining one or more input models used by the intelligent priority system in determining a reward score. For example, as discussed with respect to FIG. 2, the intelligent priority system can use an accuracy input model and/or a resource cost input model. Machine learning techniques can be used to retrain the accuracy input model and resource cost input models based on the feedback. For example, each time that an underlying target model is retrained, the amount of time and computing resources used to retrain the target model can be provided as feedback in order to improve the resource cost model. The intelligent priority evaluator system can also use a model or algorithm to determine a reward score. For example, as described with respect to FIG. 2, the inputs to the intelligent priority evaluator system can use various algorithms that can be affected by the various input in various ways. Feedback about the reward scores can be used to cause the intelligent priority evaluator system to adjust the algorithms and improve the determination of the reward score using machine learning techniques. As historical data is gathered and the intelligent priority evaluator system improves from feedback, the intelligent priority evaluator system can determine reward scores effective enough to automatically drive future scheduling decisions without requiring users to individually provide indications about the priority of the submitted tasks that are similar to previously submitted tasks.

At block 717, the system can monitor for changing conditions. This can include, for example, changes to the available computing resources, completion of tasks, submission of new tasks, changes to any of the inputs shown in FIG. 2, and the like.

At block 719, a changing condition is detected, and in response, the dynamic schedule can dynamically reschedule tasks to account for the changing conditions. This can include recalculating the reward scores for any scheduled tasks, rearranging the schedule based on the recalculated reward scores, and/or killing currently executing tasks. Whether or not to kill a currently executing task can be based on a reward score that is recalculated while the task is executing. The recalculated reward score can be based on an estimated remaining completion time for the currently executing task.

Some embodiments can benefit from the automated monitoring for changing conditions. This can include, automatically performing rescheduling to account for the changed conditions. In some embodiments, the system can be programmed to re-evaluate at least some of the reward scores (or at least the reward scores affected by the changing conditions) for the currently queued tasks in a schedule whenever the conditions change.

Some embodiments can produce counter-intuitive results that are more optimal than human results by eliminating emotional distractions such as panic. For example, the shared computing resources might include servers that both host online video game services and retrain models. A glitch may occur so that players are unable to play the online video games. Under human direction, system administrators may decide to dedicate too many computing resources to fixing the glitch, thereby reducing the available resources for model retraining. This, however, can be an inefficient overallocation of resources for fixing the glitch. In contrast, a machine can determine that conditions have changed because more computing resources are available—the servers previously hosting games no longer have any workload because players cannot play the game. Accordingly, the newly available servers can be assigned to perform more model retraining until the glitch is fixed, at which time the resources can be rescheduled to rededicate some of the servers to hosting the video game.

Figure 8:
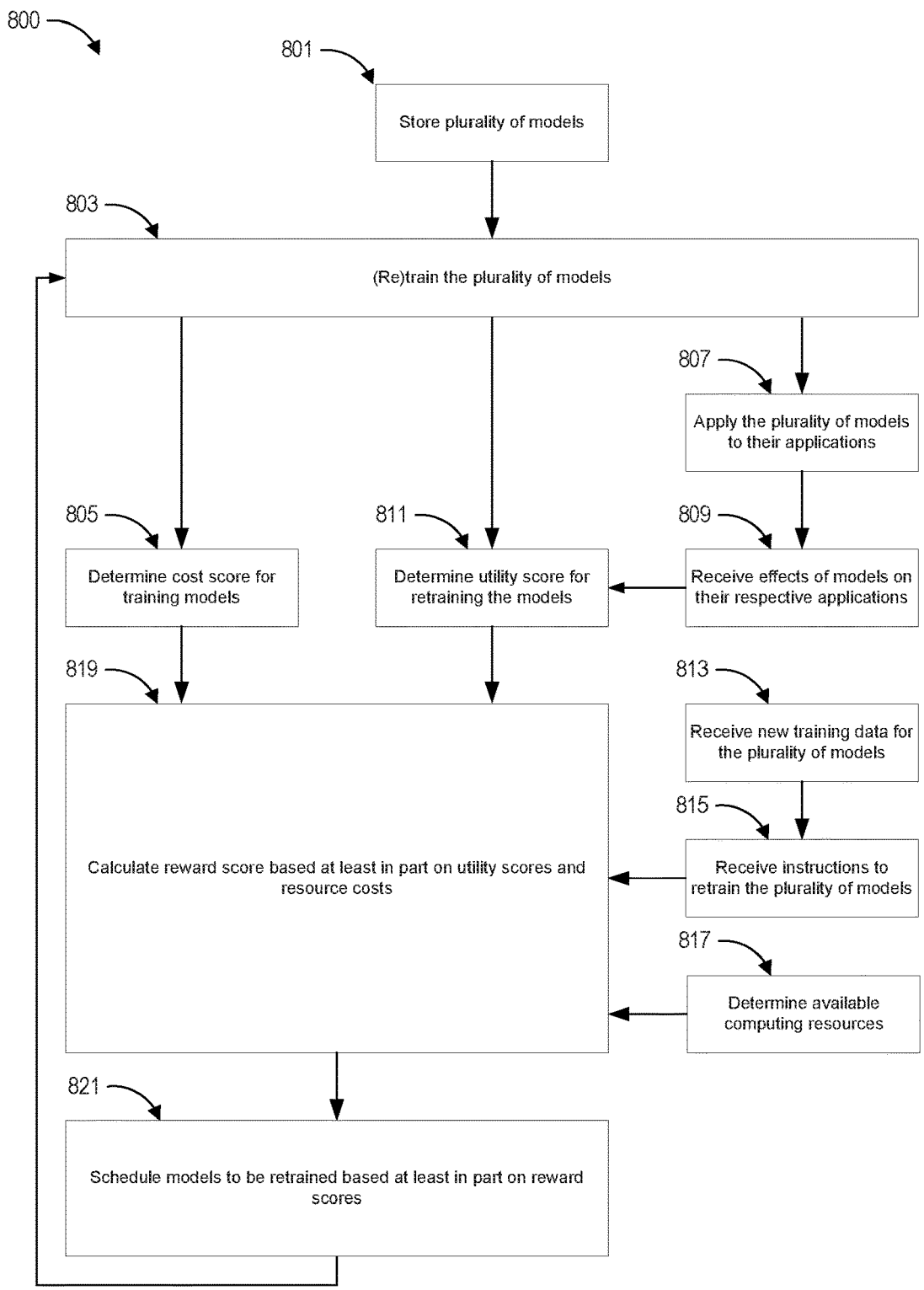
FIG. 8 illustrates a flowchart of an embodiment of a method for intelligently scheduling and executing tasks.

FIG. 8 illustrates a flowchart 800 of an embodiment of a method for intelligently scheduling and executing tasks. The method 800 can be implemented by any system that can schedule tasks for execution by shared computing resources. The process 800, in whole or in part, can be implemented by, for example, an interactive computing system intelligent priority evaluator 115 of FIG. 1, the available computing resources 111 of FIG. 1, or other systems. Although any number of systems, in whole or in part, can implement the process 800, to simplify discussion, the process 800 will be described with respect to particular systems.

At block 801, a plurality of models are stored.

At block 803, the plurality of models are trained. The models can be trained using available computing resources. Initially, this can include training the models a first time. When block 803 is repeated, block 803 can include retraining the models according to a schedule determined at block 821. Training or retraining the models can include updating the models with new training samples.

At block 805, the cost score for training the models are determined. This can be based, for example, on the resources used while performing block 803. Alternatively or additionally, this can be determined by analyzing the complexity of the model code to estimate computing requirements. The computing requirements can be estimated based on the number of lines of code, the operations performed in the code, the number of times that loops repeat in the code, and the like. Generally, a prediction model can be used to predict the computing requirements of executing other tasks and/or retraining other models. The prediction model can be trained using sample runs of the tasks and/or leveraging otherwise available training data.

At block 807, the plurality of models are applied to their underlying applications. For example, an anomalous behavior model may be used by anti-hack detection software. As another example, a level difficulty model may be used by an underlying video game engine to adjust the video game level if the level is too difficult. The underlying applications can execute on computing resources, which can be the same or different computing resources used for retraining models and/or dedicated computing resources for executing the applications.

At block 809, the effects of the models on their underlying applications are determined. This can include, for example, information discussed with respect to FIGS. 2 and 6, such as the number of hours the application is used, the users affected by the application, the popularity of the application, and assets affected by the application.

At block 811, the utility score for retraining the models can be determined. This can include factors determined as a result of training the models in block 803, and it can include factors related to underlying applications. Other examples were previously discussed with respect to FIG. 2, FIG. 4, and FIG. 5.

At block 813, new training data can be received for the plurality of models. The new training data can be used to retrain the models, and can include data samples collected over time and/or manually entered data. Different models can use different types of training data. The training data can contain new data to improve a model, recent data to synchronize a model with current trends, and the like.

At block 815, instructions can be received to retrain the plurality of models. In some embodiments, different users of a computing system submit instructions to the computing system to retrain different models. The instruction from a user can include which model to retrain. In some embodiments, the user can provide one or more user designated options with the instruction, such as those described in block 205 of FIG. 2. The instructions can be received by the computing system. In some embodiments, the instructions can be routed through a network and received by an intelligent priority evaluator 115.

At block 817, the available computing resources are determined. The amount of computing resources can include, for example, a certain number of processors, a type of operating environment, number of threads, amount of memory, number of servers, amount of power, storage space, software licenses, and the like. The amount of computing resources can include resources taken at the thread level, processor level, server level, rack level, cluster of racks, and the like. The computing resources can include the available resources allocated to a particular type of task, such as retraining models. The amount of computing resources available can be determined, for example, by querying the status of the computing resources, by tracking which of the computing resources are in use, and the like.

At block 819, based at least in part on the cost score, the utility score, and the available computing resources, and in response to receiving the instructions to retrain the plurality of models, the reward scores can be determined retraining the models.

At block 821, the models can be scheduled to be retrained based at least in part on the reward scores. The flowchart can loop back from block 821 to block 803.

Example Hardware Configuration of Computing Device

Figure 9:
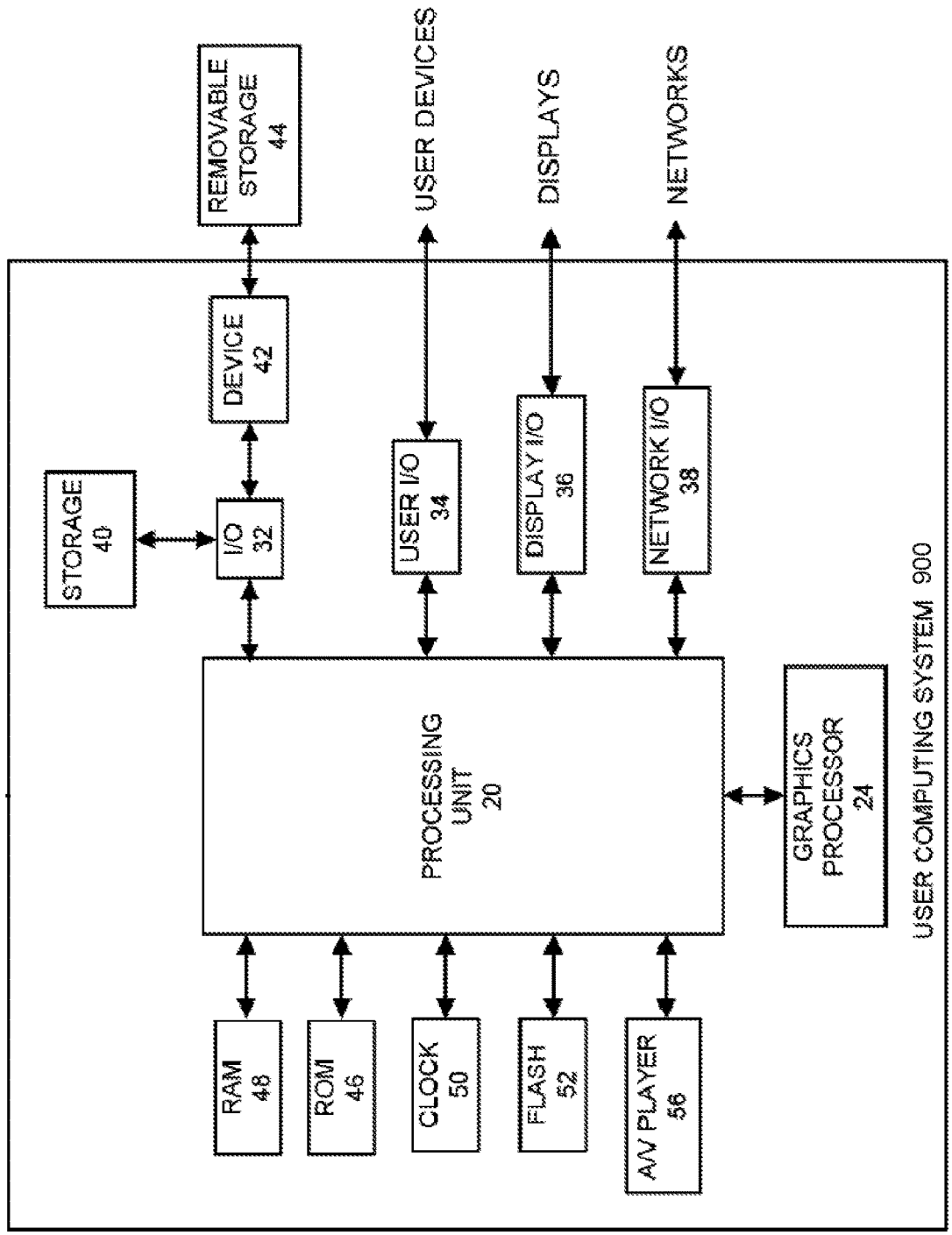
FIG. 9 illustrates an embodiment of a hardware configuration for a computing device.

FIG. 9 illustrates an embodiment of a hardware configuration for a computing device 900. Other variations of the user computing device 900 may be substituted for the examples explicitly presented herein, such as removing or adding components to the user computing system 900. The computing device 900 may include a smart phone, a tablet, a personal computer, a desktop, a laptop, a smart television, a car console display, and the like. Further, the computing device 900 may include displays such as a monitor, touchscreen display, or a touchscreen interface. The computing device 900 can be user devices 101 of FIG. 1, servers 113 of FIG. 1, and/or hardware that implements, in whole or in part, the intelligent priority evaluator 115 of FIG. 1.

As shown, the computing device 900 includes a processing unit 20 that interacts with other components of the computing device 900 and also components external to the computing device 900.

The computing device 900 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing device 900 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing device 900 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 900. Processing unit 20 can communicate through I/O 32 to store data, such as task data, model data, reward scores, prioritization factor inputs, schedules, and the like. In addition to storage 40 and removable storage media 44, computing device 800 is also shown including ROM (Read-Only Memory) 46 and RAM 48. RAM 48 may be used for data that is accessed frequently, such as task data, model data, reward scores, prioritization factor inputs, schedules, and the like.

User I/O 34 is used to send and receive commands between processing unit 20 and user devices. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The computing device 900 may comprise one or more integrated displays configured to receive display output signals produced by the display I/O 36, which may be output for display to a user. According to some embodiments, display output signals produced by the display I/O 36 may also be output to one or more display devices external to the computing device 900.

The computing device 900 can also include other features that may be used with a game, such as a clock 50, flash memory 52, and other components. An audio/video player 56 might also be used to display a video sequence. It should be understood that other components may be provided in the computing device 900 and that a person skilled in the art will appreciate other variations of the computing device 900.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state, and/or other data needed or usable for interpreting user input and generating game displays. Generally, RAM 48 is volatile storage and data stored within RAM 48 may be lost when the computing device 900 is turned off or loses power.

Information may be read from a memory device, such as RAM 48. Additionally, from storage 40, ROM 46, servers accessed via a network (not shown), or removable storage media 44. Although data is described as being found in RAM 48, it will be understood that data does not have to be stored in RAM 48 and may be stored in other memory accessible to processing unit 20 or distributed among several media, such as storage 40.

Additional Descriptions

The detailed description presents various descriptions of specific embodiments. However, the innovations described herein can be embodied in a multitude of different ways, for example, as defined and covered by the claims. In this description, reference is made to the drawings where like reference numbers can indicate identical or functionally similar elements. It will be understood that elements illustrated in the figures are not necessarily drawn to scale. Moreover, it will be understood that certain embodiments can include more elements than illustrated in the drawings and/or a subset of the illustrated elements in a particular drawing. Further, embodiments can incorporate any suitable combination of features from two or more drawings.

In the embodiments described above intelligent systems for making prioritization decisions with respect to retraining models are described in connection with particular embodiments. It will be understood, however, that the principles and advantages of the embodiments can be used for computers to make any prioritization decision. This can include prioritization decisions for any type of tasks, such as table generation, report generation, and the like.

Although certain embodiments are described with reference to a digital gaming platform, it will be understood that the principles and advantages described herein can be used in a variety of applications. Related applications include application processing, computer security, network security, authentication, and the like.

In any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not necessarily be construed to imply that these operations are order dependent. The acts of the methods discussed herein can be performed in any order as appropriate. Moreover, the acts of the methods discussed herein can be performed serially or in parallel, as appropriate. Two blocks shown in succession may, in fact, be executed substantially concurrently, or the blocks may sometimes be executed in the reverse order, depending upon the functionality involved. In addition, certain blocks may be omitted in some implementations.

In some embodiments, the techniques described herein are implemented by one or more special-purpose computing devices. For example, the one or more servers of FIG. 1 and/or the intelligent priority evaluator 115 can be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program non-transitory instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

According to some embodiments, the techniques herein are executed by the one or more processor executing one or more sequences of one or more instructions contained in non-transitory memory or data storage devices in the servers. Such instructions may be read into main memory from another storage medium, such as another storage device or data storage device. Execution of the sequences of instructions contained in memory causes the one or more processors to perform the process steps described herein. In alternative embodiments, hard-wired circuitry may be used in place of or in combination with software instructions.

Memory and data storage devices can be non-transitory media and can include volatile, non-volatile, or both volatile and nonvolatile components. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics. Transmission media can also take the form of acoustic or light waves, such as those generated during radio-wave and infra-red data communications.

Instructions, when stored in storage media accessible to one or more processors, render a computer system into a special-purpose machine that is customized to perform the operations specified in the instructions. Memory can also be used for storing temporary variables (for example, new training data samples) or other intermediate information during execution of instructions to be executed by the one or more special-purpose processors. Memory can also be a read only memory (ROM), a magnetic disk, optical disk, or USB thumb drive (Flash drive), or other static storage device for storing static information and instructions.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. The term "based on," as generally used herein, encompasses the following interpretations of the term: solely based on or based at least partly on. All numerical values provided herein are intended to include similar values within a measurement error.

Moreover, conditional language used herein, such as, among others, "can," "could," "might," "may," "for example," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein can be embodied in a variety of other forms. Furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A system for prioritizing allocation of computer resources for training computer-based models, the system comprising:
    a data store configured to store:
        a plurality of computer-based models; and
        utility factors and computing resource cost factors associated with the plurality of computer-based models;
    one or more hardware computing devices configured with specific computer-executable instructions, the specific computer-executable instructions stored in an electronic hardware memory, the one or more hardware computing devices configured to:
        receive, through a computer network, a first instruction data packet comprising a first electronic indication indicating a first request to train a first model of the plurality of computer-based models, wherein the first model is used in association with a first application;
        receive, through the computer network, a second instruction data packet comprising a second electronic indication indicating a second request to train a second model of the plurality of computer-based models, wherein the second model is used in association with a second application;
        communicate with the data store to access data packets storing utility factors and computing resource cost factors associated with the first model and the second model;
        for each of the first model and the second model, determine a reward score, wherein the reward score is determined, based at least in part on:
            a first utility factor indicative of the utility of training a model, wherein the first utility factor is indicative of an accuracy of the model and an estimate of a change in the accuracy of the model based on the training of the model;
            a second utility factor indicative of the utility of an application that uses the model, wherein the second utility factor is based at least in part on (i) a number of users of the application, (ii) a number of contacts, sharing, interactions, or relationships between users, and (iii) an amount of time the application is used, wherein the utility of the application is unrelated to the utility of the model; and
            a resource cost score of training the model, the resource cost score based on at least a plurality of computing resource cost factors associated with the model;
        determine a prioritized order for the allocation of hardware computing resources for training the first model and the second model, based at least in part on the reward score of the first model and the reward score of the second model; and
        transmit instructions to the hardware computing resources to implement training of the first model and the second model according to the prioritized order.

2. The system of claim 1, wherein the second utility factor is further indicative of:
    a number of asset-generating users affected by training the model;
    an amount of assets affected by training the model; and
    a number of users affected by training the model.

3. The system of claim 2, the utility factors for training the first model further comprise an amount of new training data available to train the first model.

4. The system of claim 1, wherein the reward score is determined based at least in part on an input model, the one or more hardware computing devices configured to generate feedback and retrain the input model.

5. The system of claim 1, wherein the utility score is further based on a feedback data, and wherein the system is further configured to:
    update the feedback data in response to the model being trained, wherein the feedback data comprises at least one of:
        a parameter that the model changes in response to being trained;
        a change in the accuracy of the model response to being trained;
        a change in the utility factors after the model is trained compared to before the model is trained;
        a time that the model is used after being trained; or
        an amount of use of the model after being trained.

6. The system of claim 1, wherein the system is further configured to:
    repeatedly monitor an amount of the computing resources that are available; and
    automatically re-schedule the prioritized order for the allocation of the computing resources to train models in response to detecting a change in the amount of the computing resources that are available, wherein re-scheduling comprises killing a currently executing task having a reward score that is lower than at least one of the reward score of the first model or the reward score of the second model.

7. The system of claim 6, wherein the system is further configured to:
    repeatedly monitor second computing resources, wherein the second computing resources are not allocated to train the first model or the second model;
    upon detecting a system failure causing underutilization of the second computing resources, allocating at least a portion of the second computing resources to train the at least one of the first model or the second model; and
    automatically re-schedule the at least one of the first model or second model among both the computing resources and the portion of the second computing resources.

8. The system of claim 1, wherein the prioritized order supersedes at least one human-input indicating an order for training the first model and the second model.

9. A computer-implemented method for intelligently retraining models, the method comprising:
  storing a plurality of models;
  training the plurality of models;
  scheduling an allocation of computing resources to train at least some of the plurality of models, wherein the schedule prioritizes models for retraining based, at least in part, on a reward score, wherein the reward score is determined for each model based, at least in part, on:
    a first utility factor indicative of the utility of training a model, wherein the first utility factor is indicative of an accuracy of the model and an estimate of a change in the accuracy of the model based on the training of the model; and
    a second utility factor indicative of the utility of an application affected by usage of the model, wherein the second utility factor is based at least in part on (i) a number of users of the application, (ii) a number of contacts, sharing, interactions, or relationships between users, and (iii) an amount of time the application is used, wherein the utility of the application is independent of the utility of training the model;
    a resource cost of training the model; and
  training the plurality of models according to the scheduled allocation of the computing resources.

10. The method of claim 9, wherein the second utility factor is further indicative of:
  a number of asset generating users affected by training the model;
  an amount assets affected by training model; and
  a number of users affected by training the model.

11. The method of claim 10, wherein the utility score is further based on a second utility factor comprising a number of new training data elements available to train the model.

12. The method of claim 9, wherein the utility score is further based on an amount that parameters of the model changed in response to a previous training of the model.

13. The method of claim 9, wherein the utility score is further based on feedback data, and wherein method further comprises:
  updating the feedback data in response to the model being trained, wherein the feedback data comprises at least one of:
    an amount that a parameters of the model changes in response to being trained;
    an change in the accuracy of the model response to being trained;
    an change in the utility factor after the model is trained compared to before the model is trained;
    a time that the model is used after being trained; or
    an amount of use of the model after being trained.

14. The method of claim 9, further comprising:
  repeatedly monitoring an amount of the computing resources that are available; and
  automatically re-schedule the allocation of the computing resources to train at least some of the plurality of models in response to detecting a change in the amount of the computing resources that are available.

15. The method of claim 14, further comprising:
  repeatedly monitoring second computing resources, wherein the second computing resources are not allocated to train the plurality of models;
  upon detecting a system failure causing underutilization of the second computing resources, allocating at least a portion of the second computing resources to train the at least some of the plurality of models; and
  automatically re-scheduling the at least some of the plurality of models among both the computing resources and the portion of the second computing resources.

16. The method of claim 9, further comprising scheduling an allocation of the computing resources to train a first model of the plurality of models before a second model of the plurality of models such that at least one human-input indication that the second model should be scheduled before the first model is superseded.

17. A non-transitory computer readable medium comprising instructions executable on one or more processors to cause a system to:
  store a plurality of models;
  train the plurality of models;
  schedule an allocation of the computing resources to train at least some of the plurality of models, wherein the schedule prioritizes models for retraining based, at least in part, on a reward score, wherein the reward score is determined for each model based, at least in part, on:
    a first utility factor indicative of the utility of training a model, wherein the first utility factor is indicative of an accuracy of the model and an estimate of a change in the accuracy of the model based on the training of the model;
    a second utility factor indicative of the utility of an application affected by usage of the model, wherein the second utility factor is based at least in part on (i) a number of users of the application, (ii) a number of contacts, sharing, interactions, or relationships between users, and (iii) an amount of time the application is used, wherein the utility of the application is unrelated to the utility of the model; and
    a resource cost of training the model; and
  train the plurality of models according to the scheduled allocation of the computing resources.

18. The computer readable medium of claim 17, wherein the second utility factor is further indicative of at least one of:
  a number of asset generating users affected by training the model;
  an amount assets affected by training model; and
  a number of users affected by training the model.

19. The system of claim 18, wherein the utility score is further based on a second utility factor comprising a number of new training data elements available to train the model.

20. The system of claim 19, wherein the utility score is further based on an amount that parameters of the model changed in response to a previous training of the model.

* * * * *